United States Patent
Chai et al.

(10) Patent No.: US 12,254,715 B2
(45) Date of Patent: Mar. 18, 2025

(54) FACIAL RECOGNITION METHOD AND APPARATUS, DEVICE AND STORAGE MEDIUM

(71) Applicant: CHINA UNIONPAY CO., LTD., Shanghai (CN)

(72) Inventors: Peilin Chai, Shanghai (CN); Yixin Dou, Shanghai (CN); Jiawei Lai, Shanghai (CN); Kunpeng Wang, Shanghai (CN); Kai Bian, Shanghai (CN); Jialiang Kang, Shanghai (CN); Naigeng Ji, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/575,813

(22) PCT Filed: Jul. 20, 2022

(86) PCT No.: PCT/CN2022/106830
§ 371 (c)(1),
(2) Date: Dec. 29, 2023

(87) PCT Pub. No.: WO2023/065744
PCT Pub. Date: Apr. 27, 2023

(65) Prior Publication Data
US 2024/0331441 A1   Oct. 3, 2024

(30) Foreign Application Priority Data

Oct. 18, 2021 (CN) ......................... 202111208371.5

(51) Int. Cl.
*G06V 40/16* (2022.01)
*G06V 10/75* (2022.01)
*G06V 10/774* (2022.01)

(52) U.S. Cl.
CPC ............ *G06V 40/172* (2022.01); *G06V 10/75* (2022.01); *G06V 10/774* (2022.01)

(58) Field of Classification Search
None
See application file for complete search history.

(56) References Cited

U.S. PATENT DOCUMENTS

| 2006/0093208 A1* | 5/2006 | Li ..................... G06F 18/24147 382/190 |
| 2020/0275016 A1 | 8/2020 | Citerin et al. |

(Continued)

FOREIGN PATENT DOCUMENTS

| CN | 105718863 A | 6/2016 |
| CN | 109858381 A | 6/2019 |
| CN | 114022926 A | 2/2022 |

OTHER PUBLICATIONS

The World Intellectual Property Organization (WIPO) International Search Report for PCT/CN2022/106830 Oct. 10, 2022 5 pages (including translation).

*Primary Examiner* — Sean M Conner
(74) *Attorney, Agent, or Firm* — ANOVA LAW GROUP, PLLC

(57) ABSTRACT

Embodiments of the disclosure provide a recognition method, apparatus, device, and storage medium and relates to the field of artificial intelligence technology. The method includes obtaining a second decision-making threshold of a feature-matching model in a target scenario by joint testing of the feature-matching model and auxiliary detection model. The method takes into full consideration the mutual influence between different algorithm models in a scenario when multiple algorithm models are used for facial recognition. Compared to manually setting a decision-making threshold for each algorithm model independently, the methods in the disclosure are more adaptable to changing sce- (Continued)

narios and scenarios with multiple models used in facial recognition. This improves the accuracy and efficiency of the obtained decision-making thresholds, thereby enhancing the accuracy of multi-model facial recognition.

11 Claims, 7 Drawing Sheets

(56) References Cited

U.S. PATENT DOCUMENTS

| | | | |
|---|---|---|---|
| 2021/0256282 A1* | 8/2021 | Kato | G06V 40/172 |
| 2022/0157078 A1* | 5/2022 | Boic | G06V 10/761 |
| 2023/0297655 A1* | 9/2023 | Kase | G06V 40/166 |
| | | | 713/186 |

* cited by examiner

FACIAL RECOGNITION METHOD AND APPARATUS, DEVICE AND STORAGE MEDIUM

CROSS-REFERENCE TO RELATED APPLICATION

This application is a national phase entry under 35 U.S.C. § 371 of International Application No. PCT/CN2022/106830, filed on Jul. 20, 2022, which claims priority to Chinese Patent Application No. 202111208371.5, filed on Oct. 18, 2021, and entitled "FACIAL RECOGNITION METHOD AND APPARATUS, DEVICE AND STORAGE MEDIUM," the entire content of all of which is incorporated herein by reference.

TECHNICAL FIELD

The present disclosure relates to the field of artificial intelligence technology and, more particularly, to a facial recognition method, apparatus, device, and storage medium.

BACKGROUND

Currently, facial recognition technology is widely used in fields such as security and finance. To enhance the accuracy of facial recognition results, a common practice is to use multiple different models to detect facial images to obtain a comprehensive recognition result. Different scenarios have varying requirements for risk control, recognition performance, and user experience in facial recognition systems. For example, in unattended terminals where live attacks frequently occur, the capability of the live detection model needs to be enhanced. In scenarios where synthetic attacks are prevalent in untrusted terminals, the capability of the synthetic image detection model needs to be heightened. In open scenarios with a higher probability of misidentification, the capability of the feature-matching model needs to be increased. To meet the customized requirements of different scenarios, it is necessary to configure decision-making thresholds for each of the multiple models in different scenarios.

The existing technology involves manually configuring decision-making thresholds for each model to adapt to changes in application scenarios. This method is not only inefficient but also tends to result in lower accuracy when using multiple models for facial recognition.

SUMMARY

Embodiments of the disclosure provide a recognition method, apparatus, device, and storage medium for improving the accuracy of facial recognition.

In one aspect, embodiments of the disclosure provide a facial recognition method, which includes the following steps: acquiring a to-be-recognized facial image in a target scenario; using at least one auxiliary detection model to verify the to-be-recognized facial image, to obtain at least one verification score; when each of the at least one verification score is greater than a first decision-making threshold of a corresponding auxiliary detection model in the target scenario, using a feature-matching model to perform feature matching on the to-be-recognized facial image, to obtain a target matching score; and when the target matching score is greater than a second decision-making threshold of the feature-matching model in the target scenario, determining that the to-be-recognized facial image is successfully recognized, where the second decision-making threshold is obtained through joint testing of the feature-matching model and the at least one auxiliary detection model.

In another aspect, embodiments of the disclosure provide a facial recognition device, which includes: an acquisition module configured to obtain a to-be-recognized facial image in a target scenario; a verification module configured to use at least one auxiliary detection model to verify the to-be-recognized facial image to obtain at least one verification score; a feature-matching module configured to, when each of the at least one verification score is greater than a first decision-making threshold of a corresponding auxiliary detection model in the target scenario, use a feature-matching model to perform feature matching on the to-be-recognized facial image to obtain a target matching score; and an identification module configured to determine that the to-be-recognized facial image is successfully recognized when the target matching score is greater than a second decision-making threshold of the feature-matching model in the target scenario, where the second decision-making threshold is obtained through joint testing of the feature-matching model and the at least one auxiliary detection model.

Optionally, the recognition module is specifically configured to: use a first sample image set to jointly test the at least one auxiliary detection model and the feature-matching model to obtain a predicted matching score for each original sample image in the first sample image set; based on a first preset interception rate, select at least one effective sample image from the first sample image set; and based on the predicted matching score corresponding to each of the at least one effective sample image, determine the second decision-making threshold.

Optionally, the recognition module is specifically configured to: multiply the first preset interception rate by the number of original sample images in the first sample image set to obtain a target screening quantity; rank each of the original sample images in the first sample image set in descending order of predicted matching score to obtain a sample image ranking result; and select the target screening quantity of effective sample images from the first sample image set based on the sample image ranking result.

Optionally, the recognition module is specifically configured to: select the minimum predicted matching score, from predicted matching scores corresponding to the at least one effective sample image, as the second decision-making threshold.

Optionally, the recognition module is specifically configured to: obtain a first sample image set and a plurality of sample thresholds; use the first sample image set to jointly test the at least one auxiliary detection model and the feature-matching model, to obtain interception rates of the feature-matching model corresponding to the plurality of sample thresholds; and select, from the obtained interception rates, a sample threshold corresponding to the second preset interception rate as the second decision-making threshold.

Optionally, the at least one auxiliary detection model includes a basic detection model and at least one feature verification model, where the first decision-making threshold corresponding to the basic detection model is obtained through testing the basic detection model, and the first decision-making threshold corresponding to each feature verification model is obtained through joint testing of the basic detection model and the corresponding feature verification model.

Optionally, the feature-matching module is further configured to: for each of the at least one feature verification model, perform the following steps: obtaining a first sample image set and a plurality of sample thresholds; using the first sample image set to jointly test the basic detection model and the feature verification model, to obtain an interception rate of the feature verification model corresponding to each of the plurality of sample thresholds; and selecting a sample threshold corresponding to the third preset interception rate from the obtained interception rates as the first decision-making threshold for the feature verification model.

Optionally, the first decision-making threshold corresponding to each of the at least one auxiliary detection model is obtained through joint testing the at least one auxiliary detection model.

Optionally, the device further includes an update module, where the update module is specifically configured to: update the first sample image set to obtain a second sample image set, where the distribution ratio of various sample images in the second sample image set is determined based on the distribution ratio of various original sample images in the first sample image set; and use the second sample image set to update the first decision-making threshold corresponding to each of at least one auxiliary detection model in the target scenario and the second decision-making threshold corresponding to the feature-matching model in the target scenario.

Optionally, the update module is specifically configured to: iterate through multiple new abnormal sample images in the target scenario, and for each iteration of a new abnormal sample image, perform the following steps: using the at least one auxiliary detection model and the feature-matching model to perform facial recognition on the new abnormal sample image, and when the recognition fails, add the new abnormal sample image to the first sample image set; and after completing the iterations, taking the obtained first sample image set as the second sample image set.

Optionally, the basic detection model is a quality detection model, and the at least one feature verification model includes a liveness detection model and a non-synthetic image detection model, and the at least one verification score includes a quality detection score, a liveness detection score, and a non-synthetic image detection score; and the verification module is specifically configured to: input the to-be-recognized facial image into the quality detection model to obtain the quality detection score of the to-be-recognized facial image; input facial features, of the to-be-recognized facial image, extracted by the quality detection model into the liveness detection model to obtain the liveness detection score of the to-be-recognized facial image; and input the facial features into the non-synthetic image detection model to obtain the non-synthetic image detection score of the to-be-recognized facial image.

In another aspect, embodiments of the disclosure provide a computer device including a memory, a processor, and a computer program stored in the memory and executable on the processor that, when executing the program, implements the steps of the facial recognition methods described above.

In another aspect, embodiments of the disclosure provide a computer-readable storage medium storing a computer program that can be executed by a computer device. When the program runs on the computer device, it causes the computer device to perform the steps of the facial recognition methods described above.

In another aspect, embodiments of the disclosure provide a computer program product, which includes a computer program stored on a computer-readable storage medium. The computer program includes program instructions that, when executed by a computer device, cause the computer device to perform the steps of the facial recognition methods described above.

In the embodiments of the disclosure, by jointly testing the feature-matching model and the at least one auxiliary detection model to obtain the second decision-making threshold of the feature-matching model in the target scenario, it takes into full consideration the mutual influence between different algorithm models in a scenario when multiple algorithm models are used for facial recognition. Compared to manually setting a decision-making threshold for each algorithm model independently, the methods in the disclosure are more adaptable to changing scenarios and scenarios with multiple models for facial recognition. This improves the accuracy and efficiency of the obtained decision-making thresholds, thereby enhancing the accuracy of multi-model facial recognition.

BRIEF DESCRIPTION OF THE DRAWINGS

To provide a clearer explanation of the technical solutions in the embodiments of the present disclosure, a brief introduction to the drawings required in the description of the embodiments will be given below. It is evident that the drawings in the following description are merely some embodiments of the present disclosure. Those skilled in the art can obtain additional drawings based on these drawings without exercising inventive effort.

DETAILED DESCRIPTION OF THE EMBODIMENTS

To make the purpose, technical solutions, and beneficial effects of the present disclosure clearer, the following detailed description is provided in conjunction with the drawings and embodiments. It should be understood that the specific embodiments described herein are merely for the purposes of explaining the present disclosure and are not intended to limit the scope of the disclosure.

Figure 1:
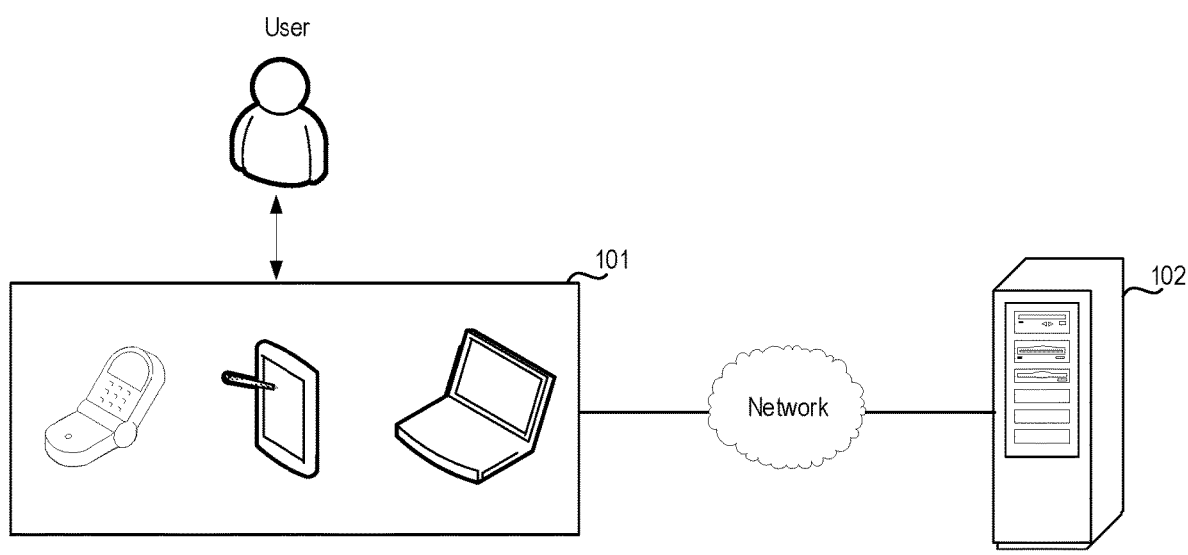
FIG. 1 illustrates a schematic diagram of a system architecture, according to embodiments of the disclosure.

FIG. 1 illustrates a schematic diagram of a system architecture, according to embodiments of the disclosure. The system architecture includes at least a terminal device 101 and a facial recognition system 102.

Terminal device 101 is equipped with a target application for facial recognition, which can be a pre-installed client, a web-based application, or a mini-program embedded in other applications. Terminal device 101 can be a smartphone, tablet, laptop, desktop computer, etc., which is not limited herein.

Facial recognition system 102 serves as the backend server for the target application by providing services to the target application. Facial recognition system 102 can be an independent physical server, a server cluster or distributed system including multiple physical servers, or a cloud server providing fundamental cloud computing services such as cloud services, cloud databases, cloud computing, cloud functions, cloud storage, network services, cloud communication, middleware services, domain services, security services, Content Delivery Networks (CDN), as well as big data and artificial intelligence platforms.

Terminal device 101 and facial recognition system 102 can be directly or indirectly connected through wired or wireless communication methods, which is not limited by the disclosure.

Terminal device 101 collects a to-be-recognized facial image in a target scenario and sends the to-be-recognized facial image to facial recognition system 102.

Facial recognition system 102 receives the to-be-recognized facial image and utilizes at least one auxiliary detection model to verify the facial image, to obtain at least one verification score. When the at least one verification score is greater than the respective first decision-making threshold of the at least one auxiliary detection model in the target scenario, a feature-matching model is employed, which compares the features of the to-be-recognized facial image and obtains a target matching score. When the target matching score is greater than a second decision-making threshold of the feature-matching model in the target scenario, the to-be-recognized facial image is determined as successfully recognized. The second decision-making threshold is obtained through joint testing of the feature-matching model and the at least one auxiliary detection model. In practical applications, the solutions presented in the embodiments of the disclosure can be applied to any scenario requiring facial recognition.

Figure 2:
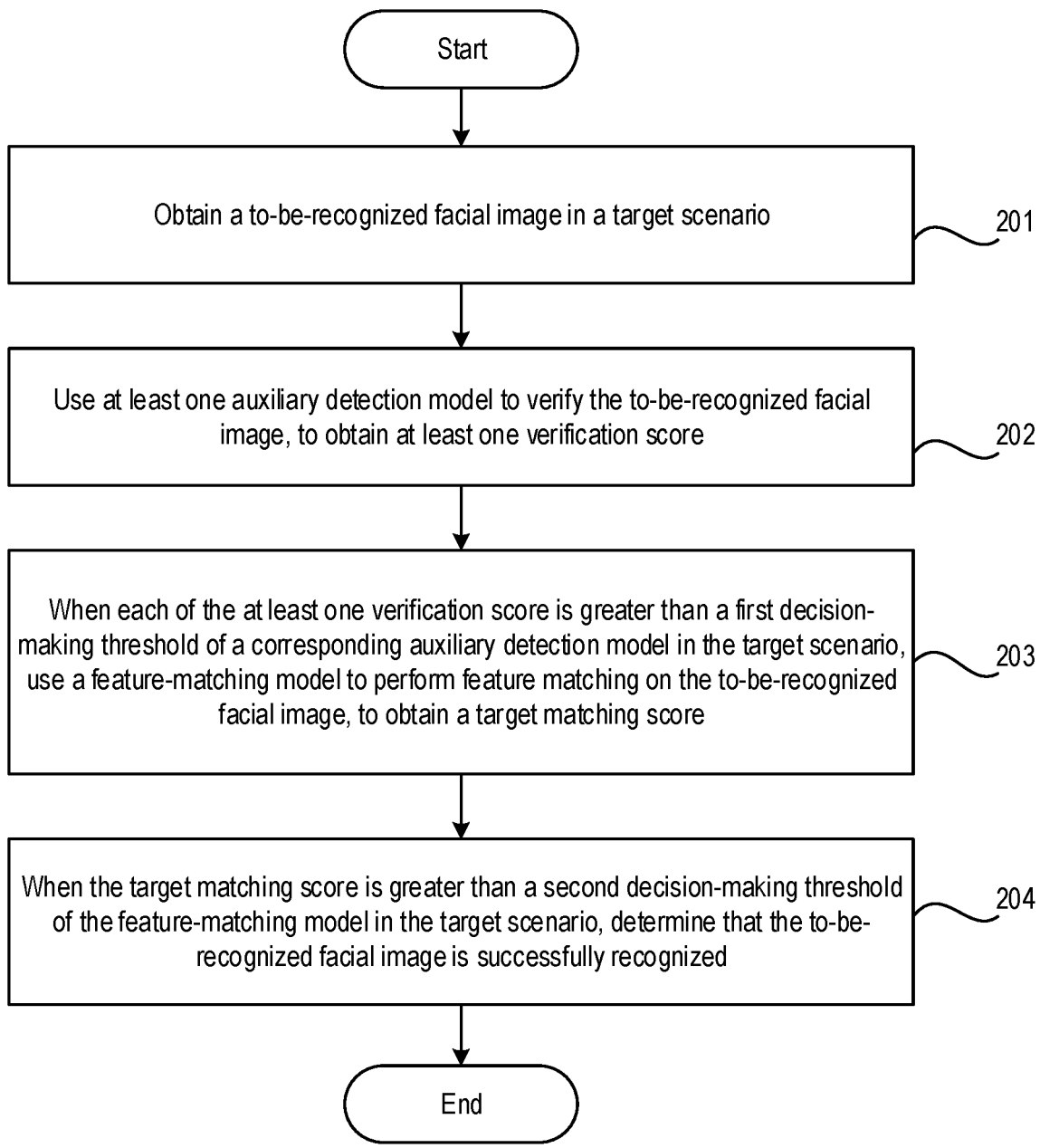
FIG. 2 illustrates a flowchart of a facial recognition method, according to embodiments of the disclosure.

Based on the system architecture shown in FIG. 1, the present disclosure provides a process for facial recognition. As shown in FIG. 2, the process is executed by the facial recognition system 102 shown in FIG. 1, and the process includes the following steps:

Step S201: Obtain a to-be-recognized facial image in a target scenario.

Specifically, the disclosure covers multiple different application scenarios and multiple different algorithm models. Application scenarios include liveness risk scenarios, hijacking risk scenarios, recognition risk scenarios, etc. Algorithm models include a quality detection model, a liveness detection model, a non-synthetic image detection model, a feature-matching model, etc.

A target scenario can be any one of the multiple different application scenarios. Each application scenario corresponds to one or more scenario risk levels, and each algorithm model also corresponds to one or more model risk levels. Each model risk level corresponds to a decision-making threshold, and this threshold is related to the interception rate obtained during the testing of the algorithm model.

In specific implementations, within each application scenario at a given scenario risk level, multiple algorithm models can be employed for facial recognition. Each algorithm model in the multiple algorithm models corresponds to a model risk level.

For example, assume that the application scenarios include liveness risk scenarios, hijacking risk scenarios, and recognition risk scenarios. Algorithm models include a quality detection model, a liveness detection model, a non-synthetic image detection model, and a feature-matching model. The model risk levels for each algorithm model in the various application scenarios at different scenario risk levels are shown in Table 1.

TABLE 1

| Application Scenario | Scenario Risk Level | Algorithm Model | Model Risk Level |
|---|---|---|---|
| liveness risk scenario | 1 | quality detection model | 2 |
| | | liveness detection model | 2 |
| | | non-synthetic image detection model | 1 |
| | | feature-matching model | 1 |
| | 2 | quality detection model | 2 |
| | | liveness detection model | 4 |
| | | non-synthetic image detection model | 1 |
| | | feature-matching model | 1 |
| hijacking risk scenario | 1 | quality detection model | 2 |
| | | liveness detection model | 2 |
| | | non-synthetic image detection model | 2 |
| | | feature-matching model | 1 |
| | 2 | quality detection model | 2 |
| | | liveness detection model | 2 |
| | | non-synthetic image detection model | 4 |
| | | feature-matching model | 1 |
| recognition risk scenario | 1 | quality detection model | 2 |
| | | liveness detection model | 1 |
| | | non-synthetic image detection model | 1 |
| | | feature-matching model | 2 |
| | 2 | quality detection model | 2 |
| | | liveness detection model | 1 |
| | | non-synthetic image detection model | 1 |
| | | feature-matching model | 4 |

Each algorithm model corresponds to different decision-making thresholds under various model risk levels, as shown in Table 2.

TABLE 2

| Algorithm Model | Model Risk Level | Decision-Making Threshold (score) |
|---|---|---|
| quality detection model | 1 | 75 |
| | 2 | 85 |
| | 3 | 95 |
| | 4 | 98 |
| liveness detection model | 1 | 75 |
| | 2 | 87 |
| | 3 | 98 |
| | 4 | 99 |
| non-synthetic image detection model | 1 | 86 |
| | 2 | 89 |
| | 3 | 93 |
| | 4 | 98 |
| feature-matching model | 1 | 78 |
| | 2 | 88 |
| | 3 | 96 |
| | 4 | 99 |

Step S202: Use at least one auxiliary detection model to verify the to-be-recognized facial image, to obtain at least one verification score.

Step S203: When each of the at least one verification score is greater than a first decision-making threshold of a corresponding auxiliary detection model in the target scenario, use a feature-matching model to perform feature matching on the to-be-recognized facial image, to obtain a target matching score.

Specifically, the first decision-making threshold for each of the at least one auxiliary detection model in the target scenario can be either the same or different. When the target scenario corresponds to multiple scenario risk levels, the first decision-making threshold is a decision-making threshold corresponding to a scenario risk level of the auxiliary detection model in the target scenario.

For example, assume that that the at least one auxiliary detection model includes a quality detection model, a liveness detection model, and a non-synthetic image detection model.

As shown in Table 1, for a level 1 scenario risk level in the liveness risk scenario, the model risk levels for the quality detection model, liveness detection model, and non-synthetic image detection model are 2, 2, and 1, respectively. According to Table 2, the corresponding first decision-making threshold for the quality detection model is 85 when the model risk level is 2, the corresponding first decision-making threshold for the liveness detection model is 87 when the model risk level is 2, and the corresponding first decision-making threshold for the non-synthetic image detection model is 86 when the model risk level is 1.

Specifically, the various auxiliary models can be structured either in a serial or parallel configuration.

When the various auxiliary models are structured in a serial configuration, different levels of auxiliary models are used sequentially to verify the to-be-recognized facial image. When the verification score for each respective auxiliary model is greater than the first decision-making threshold, the feature-matching model is then used to perform feature matching on the to-be-recognized facial image. If, during the verification process, any auxiliary model has a verification score less than or equal to the first decision-making threshold, the system directly outputs "facial recognition fails" and the process ends.

When the various auxiliary models are structured in a parallel configuration, when the verification scores for all auxiliary models are greater than the first decision-making threshold, the feature-matching model is then used to perform feature matching on the to-be-recognized facial image. When any one of the auxiliary models has a verification score less than the first decision-making threshold, the system directly outputs "facial recognition fails" and the process ends.

Step S204: When the target matching score is greater than a second decision-making threshold of the feature-matching model in the target scenario, determine that the to-be-recognized facial image is successfully recognized.

The second decision-making threshold is obtained through joint testing of the feature-matching model and the at least one auxiliary detection model. When determining the second decision-making threshold, the feature-matching model can undergo joint testing with one or more of the aforementioned at least one auxiliary detection model.

When the target matching score is less than or equal to the second decision-making threshold of the feature-matching model in the target scenario, it is determined that the recognition of the to-be-recognized facial image fails, and interception is performed on the to-be-recognized facial image.

When the target scenario corresponds to multiple scenario risk levels, the second decision-making threshold is the decision-making threshold corresponding to a scenario risk level of the feature-matching model in the target scenario.

For example, assume that the at least one auxiliary detection model includes the quality detection model, the liveness detection model, and the non-synthetic image detection model. As shown in Table 1, for a level 1 scenario risk level in the liveness risk scenario, the model risk levels for the quality detection model, liveness detection model, non-synthetic image detection model, and feature-matching model are 2, 2, 1, and 1, respectively. By querying Table 2, it can be seen that the second decision-making threshold for the feature-matching model is 78 when the model risk level is 1.

In the embodiments of the disclosure, the method considers the joint testing of the feature-matching model and the at least one auxiliary detection model to obtain the second decision-making threshold of the feature-matching model in the target scenario. This method takes into full consideration the mutual influence between different algorithm models in a scenario when multiple algorithm models are used for facial recognition. Compared to manually setting a decision-making threshold for each algorithm model independently, the methods in the disclosure are more adaptable to changing scenarios and scenarios with multiple models for facial recognition. This improves the accuracy and efficiency of the obtained decision-making thresholds, thereby enhancing the accuracy of multi-model facial recognition.

Optionally, in the above step S202, embodiments of the disclosure employ at least the following approaches to obtain the first decision-making threshold.

Implementation Method 1: The at least one auxiliary detection model includes a basic detection model and at least one feature verification model. The first decision-making threshold for the basic detection model is obtained through testing the basic detection model. The first decision-making threshold for each feature verification model is obtained through joint testing of the basic detection model and the corresponding feature verification model.

For the basic detection model, a plurality of sample thresholds are pre-set. Then, using a first sample image set, the basic detection model is tested to obtain interception rates corresponding to the basic detection model at the plurality of sample thresholds. Among the obtained interception rates, the sample threshold corresponding to a fourth preset interception rate is selected as the first decision-making threshold for the basic detection model.

Specifically, the plurality of sample thresholds can be randomly set or set according to preset intervals. By setting different fourth preset interception rates, the first decision-making threshold for the basic detection model can be obtained at different model risk levels.

The first sample image set is used to test the basic capabilities of the model. The sample categories and distribution ratio of the samples in the first sample image set are determined based on the distribution of sample attributes in actual application scenarios. The first sample image set contains a rich variety of samples and a large sample size, ensuring the reliability of the test results. The distribution of sample attributes in the first sample image set is close to the actual application scenarios, ensuring that the test results are consistent with the actual applications.

For example, multiple sample thresholds are set for the basic detection model, namely 5, 15, 25, 35, 45, 55, 65, 75, 85, and 95. Using the first sample image set, the basic detection model is tested to obtain the interception rate corresponding to the basic detection model at each of the sample thresholds, as shown in Table 3. Assuming the fourth preset interception rate is 99%, querying Table 3 with the fourth preset interception rate yields the first decision-making threshold for the basic detection model as 95.

TABLE 3

| Sample Threshold (Score) | Interception Rate |
| --- | --- |
| 5 | 2% |
| 15 | 16% |

TABLE 3-continued

| Sample Threshold (Score) | Interception Rate |
| --- | --- |
| 25 | 29% |
| 35 | 38% |
| 45 | 49% |
| 55 | 60% |
| 65 | 72% |
| 75 | 85% |
| 85 | 95% |
| 95 | 99% |

In Implementation Method 1, the efficiency of obtaining decision-making thresholds is improved by setting multiple sample thresholds, determining the interception rate corresponding to the basic detection model at each sample threshold, and directly selecting the sample threshold corresponding to the preset interception rate as the first decision-making threshold for the basic detection model.

In some embodiments, to obtain the first decision-making threshold for each feature verification model, the following steps are executed for each feature verification model:

Obtain the first sample image set and a plurality of sample thresholds. Use the first sample image set to conduct joint testing of the basic detection model and the feature verification model, to obtain the interception rate of the feature verification model at the plurality of sample thresholds. Select the sample threshold corresponding to the third preset interception rate from the obtained interception rates as the first decision-making threshold for the feature verification model.

Specifically, the plurality of sample thresholds can be randomly set or set according to preset intervals. Setting different third preset interception rates allows obtaining the first decision-making thresholds for the feature verification model at different model risk levels.

In one embodiment, first, determine the first decision-making threshold for the basic detection model, then conduct joint testing of the basic detection model and each feature verification model to obtain the interception rate of each feature verification model at the plurality of sample thresholds.

For example, set the first decision-making threshold for the basic detection model to 95. The at least one feature verification model includes Feature Verification Model 1 and Feature Verification Model 2.

For Feature Verification Model 1, set multiple sample thresholds: 5, 35, 65, 85, 95, and 98. With the premise that the first decision-making threshold for the basic detection model is 95, conduct joint testing of the basic detection model and Feature Verification Model 1 using the first sample image set, to obtain the interception rates of Feature Verification Model 1 at the plurality of sample thresholds, as shown in Table 4.

Assume that the third preset interception rate is 99%, use this rate to query Table 4 and it can be determined that the first decision-making threshold for Feature Verification Model 1 is 98. The same method can be applied to determine the first decision-making threshold for Feature Verification Model 2, details of which are not reiterated here.

TABLE 4

| Sample Threshold (Score) | Interception Rate |
| --- | --- |
| 5 | 10% |
| 35 | 45% |

TABLE 4-continued

| Sample Threshold (Score) | Interception Rate |
| --- | --- |
| 65 | 72% |
| 85 | 90% |
| 95 | 98% |
| 98 | 99% |

In the embodiments of the disclosure, the first decision-making threshold for a feature verification model is determined through joint testing of the base detection model and the feature verification model. This approach takes into account the interrelationships between multiple algorithm models in the context of multi-model facial recognition, thereby enhancing the accuracy of the first decision-making threshold.

In some embodiments, a testing sequence is configured for the at least one feature verification model, to determine the first decision-making threshold for the base detection model. Each feature verification model is tested sequentially according to the defined sequence. For each feature verification model, joint testing is conducted with the base detection model, the respective feature verification model, and any previously tested feature verification model. This process yields the interception rates for the feature verification model at various sample thresholds.

For instance, assume that the first decision-making threshold for the base detection model is set at 95, and the at least one feature verification model includes Feature Verification Model 1 and Feature Verification Model 2. The testing sequence for Feature Verification Model 1 and Feature Verification Model 2 includes first testing Feature Verification Model 1 and then testing Feature Verification Model 2.

For Feature Verification Model 1, a plurality of sample thresholds are set, such as 5, 35, 65, 85, 95, and 98. Under the premise that the first decision-making threshold for the base detection model is 95, the first sample image set is used to conduct joint testing with the base detection model and Feature Verification Model 1. The interception rates for Feature Verification Model 1 at the above-specified sample thresholds are obtained, as shown in Table 5.

Assuming the third preset interception rate is 99%, Table 5 is queried to determine the first decision-making threshold for Feature Verification Model 1, which is found to be 98.

TABLE 5

| Sample Threshold (Score) | Interception Rate |
| --- | --- |
| 5 | 16% |
| 35 | 50% |
| 65 | 78% |
| 85 | 93% |
| 95 | 98% |
| 98 | 99% |

For Feature Verification Model 2, a plurality of sample thresholds are set, such as 25, 45, 65, 85, 95, and 99. Under the premise that the first decision-making threshold for the base detection model is 95, and the first decision-making threshold for Feature Verification Model 1 is 98, the first sample image set is used to conduct joint testing with the base detection model, Feature Verification Model 1, and Feature Verification Model 2. The interception rates for Feature Verification Model 2 at the above-specified sample thresholds are obtained, as shown in Table 6.

Assuming that the third preset interception rate is 99%, Table 6 is queried to determine the first decision-making threshold for Feature Verification Model 2, which is found to be 99.

TABLE 6

| Sample Threshold (Score) | Interception Rate |
|---|---|
| 25 | 30% |
| 45 | 52% |
| 65 | 72% |
| 85 | 92% |
| 95 | 98% |
| 99 | 99% |

In the disclosed embodiments, the first decision-making threshold of a feature verification model is obtained through joint testing with the basic detection model, the specific feature verification model, and the already tested feature verification model(s). This not only considers the correlation between the basic detection model and the feature verification model(s) in the multi-model facial recognition scenarios, but also takes into account the correlation between different feature verification models, thereby improving the accuracy of the first decision-making threshold.

Implementation Method 2: The first decision-making threshold for each of at least one auxiliary detection model is obtained through joint testing of the at least one auxiliary detection model.

In one embodiment, for each auxiliary detection model, a plurality of sample thresholds are set, which can be either randomly set or set at preset intervals.

Using the first sample image set, joint testing is conducted on each of the at least auxiliary detection model, to obtain the corresponding interception rates for each auxiliary detection model at various sample thresholds. For each auxiliary detection model, the sample threshold corresponding to a fifth preset interception rate is chosen as its first decision-making threshold.

For instance, assume that the at least one auxiliary detection model includes Auxiliary Detection Model 1 and Auxiliary Detection Model 2.

For each of the Auxiliary Detection Model 1 and Auxiliary Detection Model 2, set multiple sample thresholds, such as 5, 35, 65, 85, 95, and 98. Using the first sample image set, conduct joint testing on Auxiliary Detection Model 1 and Auxiliary Detection Model 2 to obtain their interception rates at the specified sample thresholds, as shown in Table 7.

Assume that the fifth preset interception rate for Auxiliary Detection Model 1 is 99%, and the fifth preset interception rate for Auxiliary Detection Model 2 is 98%, query Table 7 with these rates to obtain the first decision-making threshold for Auxiliary Detection Model 1 to be 98 and the first decision-making threshold for Auxiliary Detection Model 2 to be 95.

TABLE 7

| Sample Threshold (Score) | Auxiliary Detection Model 1 Interception Rate | Auxiliary Detection Model 2 Interception Rate |
|---|---|---|
| 5 | 12% | 10% |
| 35 | 49% | 45% |
| 65 | 76% | 72% |
| 85 | 90% | 90% |
| 95 | 97% | 98% |
| 98 | 99% | 99% |

In the disclosed embodiments, the first decision-making thresholds of the auxiliary detection models are obtained through joint testing of multiple auxiliary detection models. The relationships between multiple auxiliary detection models in the context of multi-model facial recognition scenarios are considered, thereby improving the accuracy of the first decision-making threshold.

In some embodiments, in the above step S204, the disclosure uses at least the following methods to obtain the second decision-making threshold.

Figure 3:
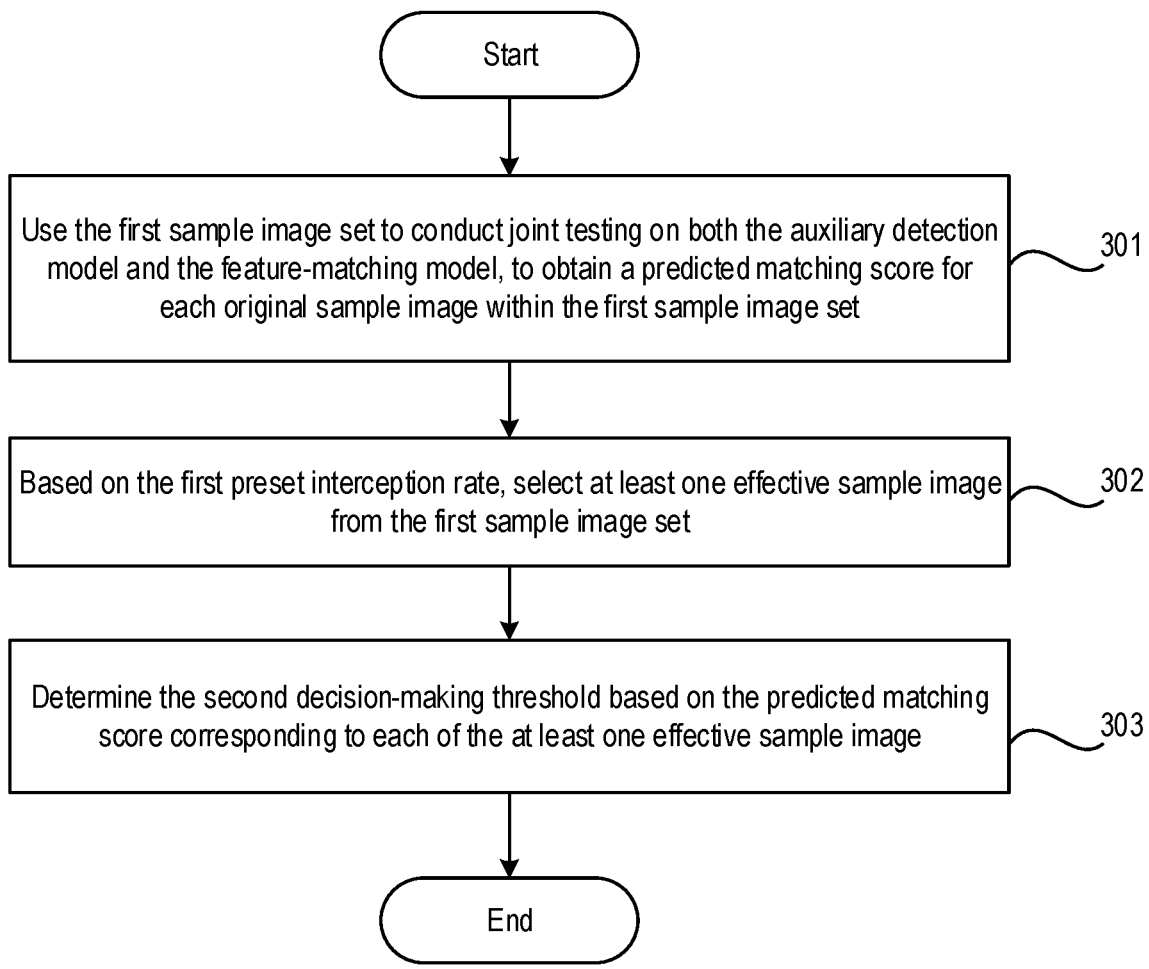
FIG. 3 illustrates a flowchart for obtaining a second decision-making threshold, according to embodiments of the disclosure.

Implementation Method 1: The second decision-making threshold is obtained using the following method, as shown in FIG. 3, which includes the following steps.

Step S301: Use the first sample image set to conduct joint testing on both the auxiliary detection model and the feature-matching model, to obtain a predicted matching score for each original sample image within the first sample image set.

Specifically, the auxiliary detection model can be either the previously described basic detection model or the feature verification model.

The first sample image set and the first preset interception rates are obtained. For each original sample image in the first sample image set, input the image into both the auxiliary detection model and the feature-matching model for joint testing. This yields similarity scores between the original sample image and various reference facial images in the facial recognition database. Select the highest similarity score as the predicted matching score for that original sample image.

Repeat the same steps for the other original sample images in the first sample image set to obtain the predicted matching score for each original sample image.

Step S302: Based on the first preset interception rate, select at least one effective sample image from the first sample image set.

Specifically, multiply the first preset interception rate of the feature-matching model by the number of original sample images in the first sample image set to obtain a target screening quantity. Rank the original sample images in the first sample image set based on their predicted matching scores in descending order, to obtain a sample image ranking result. Then, select the target screening quantity of effective sample images from the sample image set according to the sample image ranking result.

Step S303: Determine the second decision-making threshold based on the predicted matching score corresponding to each of the at least one effective sample image.

Specifically, the minimum predicted matching score can be selected, from the predicted matching scores corresponding to the at least one effective sample image, as the second decision-making threshold. Alternatively, another predicted matching score can also be chosen, from the predicted matching scores corresponding to the at least one effective sample image, as the second decision-making threshold.

By configuring different first preset interception rates, the second decision-making threshold for the feature-matching model can be obtained for different model risk levels.

For example, when the first sample image set contains 5,000 original sample images, and the first preset interception rate for the feature-matching model is set at 0.1%.

For each original sample image, conduct joint testing by inputting the original sample image into the auxiliary detection model and the feature-matching model, to obtain similarity scores between the original sample image and reference facial images in the facial recognition database. The highest similarity score is selected as the predicted matching score for that original sample image. Repeat this process until predicted matching scores are determined for all 5,000 original sample images.

Multiply the first preset interception rate by the number of images in the first sample image set to obtain the target screening quantity, which is 5. Rank the 5,000 original sample images based on their predicted matching scores in descending order. Select the top 5 original sample images as effective sample images, as shown in Table 8.

From Table 8, it can be seen that the minimum predicted matching score, among the predicted matching scores of the selected effective sample images, is 90. Therefore, 90 is chosen as the second decision-making threshold for the feature-matching model.

TABLE 8

| Original Sample Image | Predicted Matching Score |
|---|---|
| Original Sample Image 120 | 98 |
| Original Sample Image 29 | 96 |
| Original Sample Image 43 | 95 |
| Original Sample Image 40 | 92 |
| Original Sample Image 58 | 90 |

Implementation Method Two: The second decision-making threshold is obtained as follows:

Obtain the first sample image set and a plurality of sample thresholds. Use the first sample image set to conduct joint testing on the auxiliary detection model and the feature-matching model, to obtain the corresponding interception rates of the feature-matching model at various sample thresholds. Select the sample threshold corresponding to the second preset interception rate as the second decision-making threshold.

Specifically, the plurality of sample thresholds can be randomly set or configured at preset intervals.

Initially, determine the first decision-making threshold for the auxiliary detection model by using the first sample image set. Then, perform joint testing on the auxiliary detection model and the feature-matching model, to obtain the interception rates of the feature-matching model at various sample thresholds. Among the obtained interception rates, select the sample threshold corresponding to the second preset interception rate as the second decision-making threshold. By setting different second preset interception rates, the second decision-making threshold for the feature-matching model can be obtained for different model risk levels.

For example, when the first decision-making threshold for the auxiliary detection model is set at 98, and for the feature-matching model, the plurality of sample thresholds are set at 10, 30, 60, 90, 92, 94, 96, and 98. Under the premise of the auxiliary detection model's first decision-making threshold being 98, conduct joint testing on the auxiliary detection model and the feature-matching model using the first sample image set, to obtain the interception rates of the feature-matching model at the above-specified sample thresholds, as shown in Table 9.

Set the second preset interception rate at 99%. Use the set second preset interception rate to query Table 9, and it is determined that the second decision-making threshold for the feature-matching model is 98.

TABLE 9

| Sample Threshold (Score) | Interception Rate |
|---|---|
| 10 | 10% |
| 30 | 45% |
| 60 | 72% |

TABLE 9-continued

| Sample Threshold (Score) | Interception Rate |
|---|---|
| 90 | 93% |
| 92 | 95% |
| 94 | 96% |
| 96 | 97% |
| 98 | 99% |

Optionally, the aforementioned at least one auxiliary detection model includes a basic detection model and at least one feature verification model. The basic detection model is a quality detection model, and the at least one feature verification model includes a liveness detection model and a non-synthetic image detection model.

Figure 4:
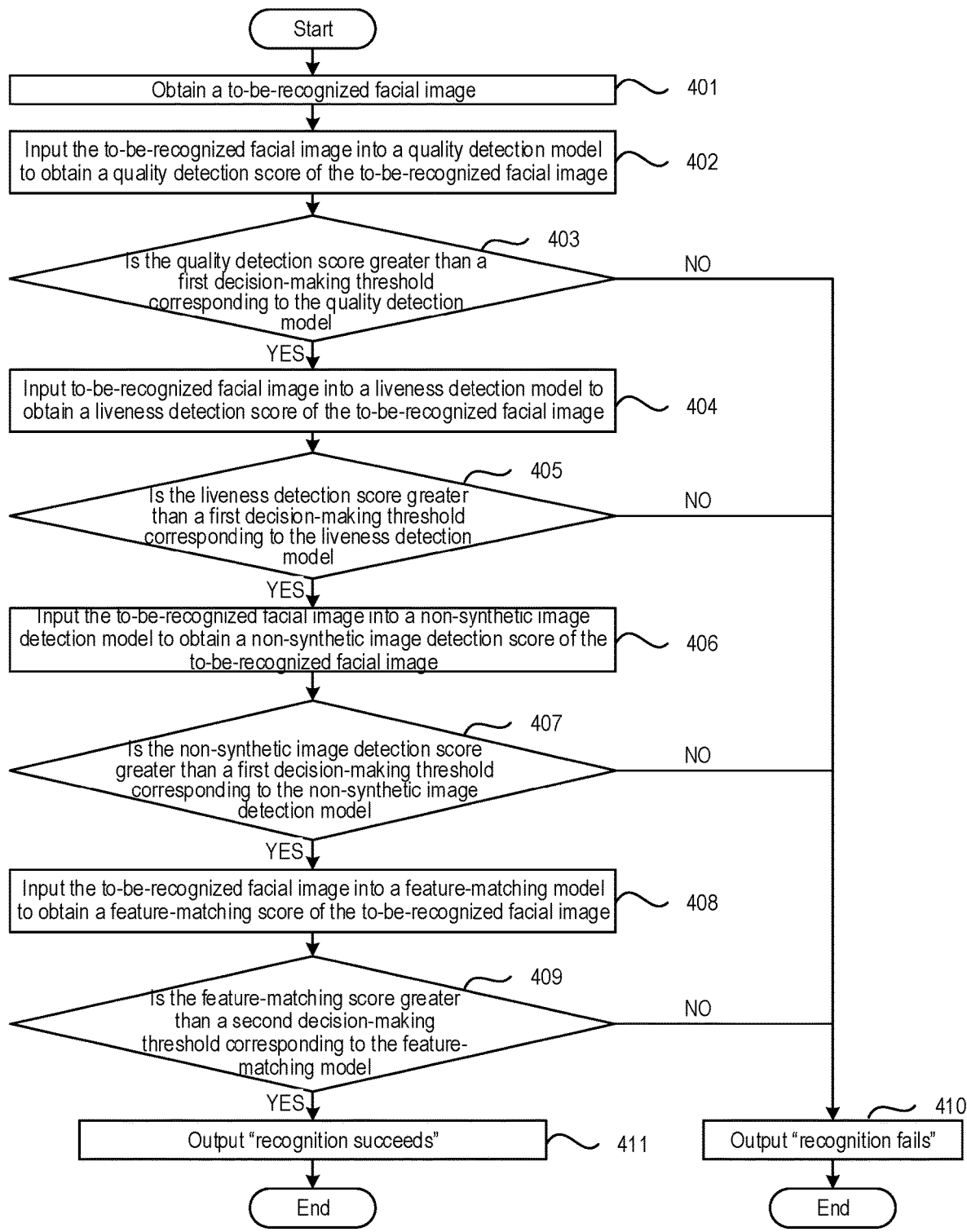
FIG. 4 illustrates a flowchart of another facial recognition method, according to embodiments of the disclosure.

Referring to FIG. 4, embodiments of the disclosure provide a facial recognition method. The process flow of the method is executed by the facial recognition system 102 shown in FIG. 1, including the following steps:

Step S401: Obtain a to-be-recognized facial image.

Step S402: Input the to-be-recognized facial image into a quality detection model to obtain a quality detection score of the to-be-recognized facial image.

Specifically, input the to-be-recognized facial image into the quality detection model. The quality detection model extracts the facial features of the to-be-recognized facial image and predicts the quality detection score of the to-be-recognized facial image based on the facial features.

Step S403: Determine whether the quality detection score is greater than a first decision-making threshold corresponding to the quality detection model. If yes, proceed to Step S404; otherwise, proceed to Step S410 and end the process.

Step S404: Input the to-be-recognized facial image into a liveness detection model to obtain a liveness detection score of the to-be-recognized facial image.

Step S405: Determine whether the liveness detection score is greater than a first decision-making threshold corresponding to the liveness detection model. If yes, proceed to Step S406; otherwise, proceed to Step S410 and end the process.

Step S406: Input the to-be-recognized facial image into a non-synthetic image detection model to obtain a non-synthetic image detection score of the to-be-recognized facial image.

Step S407: Determine whether the non-synthetic image detection score is greater than a first decision-making threshold corresponding to the non-synthetic image detection model. If yes, proceed to Step S408; otherwise, proceed to Step S410 and end the process.

Step S408: Input the to-be-recognized facial image into a feature-matching model to obtain a feature-matching score of the to-be-recognized facial image.

Step S409: Determine whether the feature-matching score is greater than a second decision-making threshold corresponding to the feature-matching model. If yes, output "recognition succeeds" and end the process; otherwise, proceed to Step S410 and end the process.

Step S410: Output "recognition fails".

Step S411: Output "recognition succeeds".

In the embodiments of the disclosure, the to-be-recognized facial image is sequentially input to the quality detection model, liveness detection model, non-synthetic image detection model, and feature-matching model, and the corresponding threshold comparisons are performed, which can improve the accuracy of facial recognition. Since the decision-making thresholds corresponding to each model are not independently set but obtained through joint testing of the respective models, the mutual influence between the models is fully considered, thereby improving the accuracy of the obtained decision-making thresholds and, consequently, enhancing the accuracy of facial recognition.

Optionally, in the embodiments of the disclosure, at least the following method is used to update the first decision-making threshold of the at least one auxiliary detection model and the second decision-making threshold of the feature-matching model, which includes the following steps:

Update the first sample image set to obtain a second sample image set. Use the second sample image set to update the first decision-making threshold corresponding to each of at least one auxiliary detection model in the target scenario and update the second decision-making threshold corresponding to the feature-matching model in the target scenario.

Specifically, the distribution ratio of various sample images in the second sample image set is determined based on the distribution ratio of various original sample images in the first sample image set. The distribution ratio is the ratio of the number of new abnormal sample images to the total number of images in the first sample image set.

Use the at least one auxiliary detection model and feature-matching model to perform facial recognition on a new abnormal sample image. When the recognition fails, add the new abnormal sample image to the first sample image set. The first sample image set obtained after iterations of all the new abnormal sample images is then taken as the second sample image set.

Figure 5:
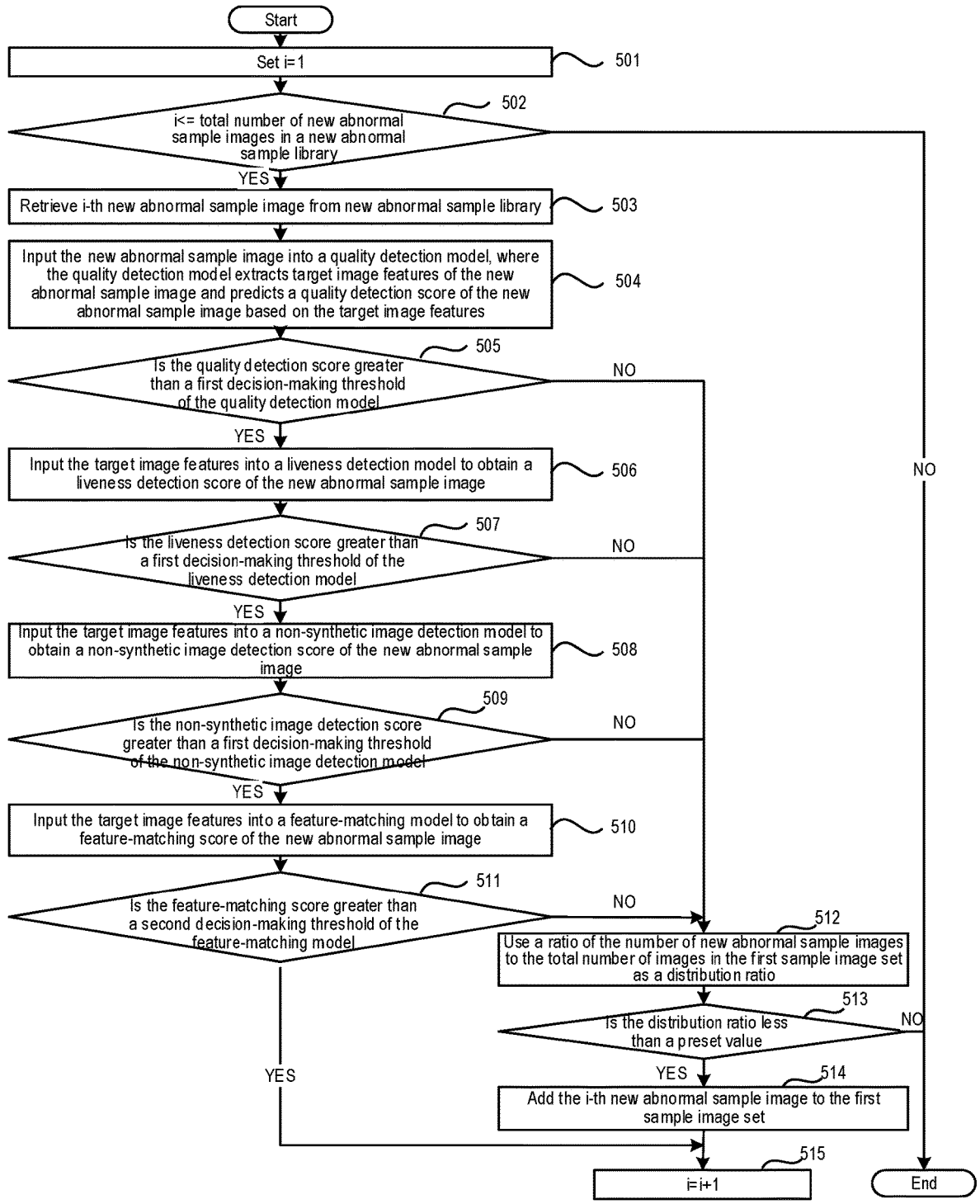
FIG. 5 illustrates a flowchart for updating a first sample image set, according to embodiments of the disclosure.

In one example, the first sample image set is updated to obtain the second sample image set, as shown in FIG. 5, which includes the following steps:

Step S501: Set i=1.

Step S502: Determine whether i is less than or equal to the total number of new abnormal sample images in a new abnormal sample library. If yes, proceed to Step S503; otherwise, end the process.

Step S503: Retrieve the i-th new abnormal sample image from the new abnormal sample library.

Step S504: Input the new abnormal sample image into a quality detection model, where the quality detection model extracts target image features of the new abnormal sample image and predicts a quality detection score of the new abnormal sample image based on the target image features.

Step S505: Determine whether the quality detection score is greater than a first decision-making threshold of the quality detection model. If yes, proceed to Step S506; otherwise, proceed to Step S512.

Step S506: Input the target image features into a liveness detection model to obtain a liveness detection score of the new abnormal sample image.

Step S507: Determine whether the liveness detection score is greater than a first decision-making threshold of the liveness detection model. If yes, proceed to Step S508; otherwise, proceed to Step S512.

Step S508: Input the target image features into a non-synthetic image detection model to obtain a non-synthetic image detection score of the new abnormal sample image.

Step S509: Determine whether the non-synthetic image detection score is greater than a first decision-making threshold of the non-synthetic image detection model. If yes, proceed to Step S510; otherwise, proceed to Step S512.

Step S510: Input the target image features into a feature-matching model to obtain a feature-matching score of the new abnormal sample image.

Step S511: Determine whether the feature-matching score is greater than a second decision-making threshold of the feature-matching model. If yes, proceed to Step S514; otherwise, proceed to Step S512.

Step S512: Use a ratio of the number of new abnormal sample images to the total number of images in the first sample image set as a distribution ratio.

Step S513: Determine whether the distribution ratio is less than a preset value. If yes, proceed to Step S514; otherwise, end the process.

Step S514: Add the i-th new abnormal sample image to the first sample image set.

Step S515: Set i=i+1 and proceed to Step S502.

The first sample image set obtained after performing the above steps is then the second sample image set.

In the embodiments of the disclosure, by continuously adding new abnormal sample images to the first sample image set, the first sample image set is updated. This consistently takes in new abnormal sample images from different target scenarios, thereby enhancing the versatility of the facial recognition method in the disclosure and strengthening its preventive capability against various risks. The stability of the first sample image set is ensured by adding new abnormal sample images to the image set based on the distribution ratio.

Figure 6:
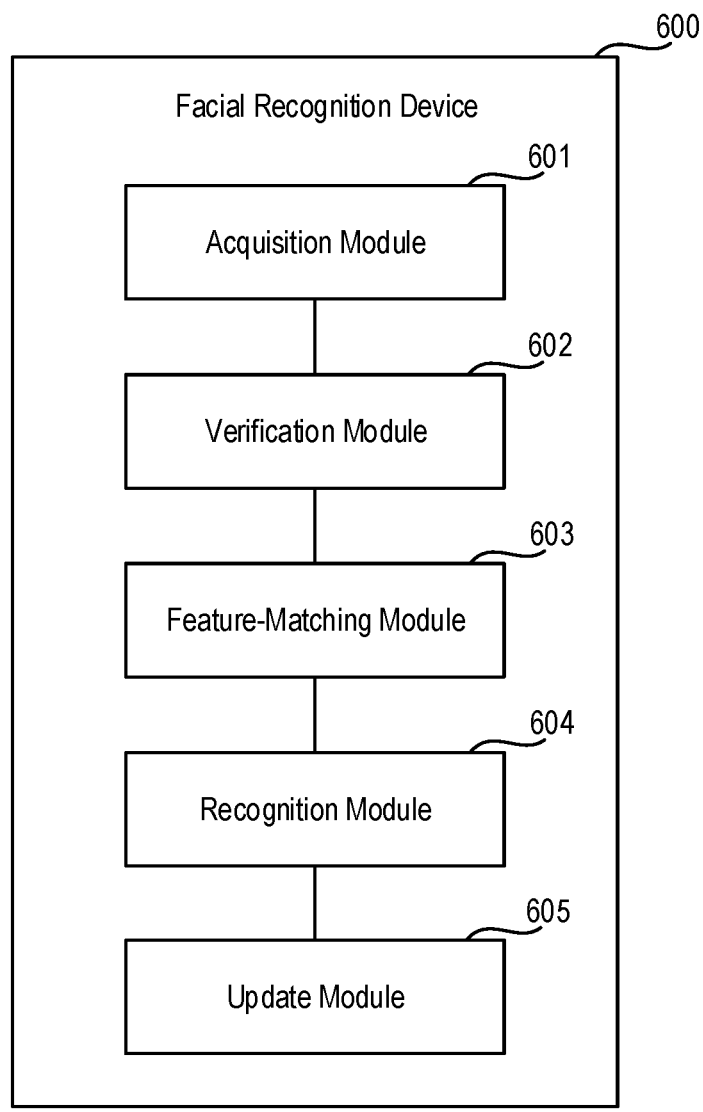
FIG. 6 illustrates a structural diagram of a facial recognition device, according to embodiments of the disclosure.

Based on similar technological concepts, embodiments of the disclosure provide a facial recognition device, as shown in FIG. 6. The device 600 includes:

Acquisition module 601: This model is configured to obtain a to-be-recognized facial image in a target scenario.

Verification module 602: This model is configured to verify the to-be-recognized facial image using at least one auxiliary detection model, to obtain at least one verification score.

Feature-matching module 603: When each of the at least one verification score is greater than a first decision-making threshold of a corresponding auxiliary detection model in the target scenario, this model uses a feature-matching model to perform feature matching on the to-be-recognized facial image, to obtain a target matching score.

Recognition module 604: When the target matching score is greater than a second decision-making threshold of the feature-matching model in the target scenario, this model determines that the to-be-recognized facial image is successfully recognized, where the second decision-making threshold is obtained through joint testing of the feature-matching model and the at least one auxiliary detection model.

Optionally, the recognition module 604 is specifically configured to: use the first sample image set to jointly test the at least one auxiliary detection model and the feature-matching model to obtain a predicted matching score for each original sample image in the first sample image set; based on the first preset interception rate, select at least one effective sample image from the first sample image set; and based on the predicted matching score corresponding to each of the at least one effective sample image, determine the second decision-making threshold.

Optionally, the recognition module 604 is specifically configured to: multiply the first preset interception rate by the number of original sample images in the first sample image set to obtain a target screening quantity; rank each of the original sample images in the first sample image set in descending order of predicted matching score to obtain the sample image ranking result; and select the target screening quantity of effective sample images from the sample image set based on the sample image ranking result.

Optionally, the recognition module 604 is specifically configured to: select the minimum predicted matching score from the predicted matching scores corresponding to the at least one effective sample image as the second decision-making threshold.

Optionally, the recognition module 604 is specifically configured to: obtain the first sample image set and a plurality of sample thresholds; use the first sample image set to jointly test the at least one auxiliary detection model and the feature-matching model, to obtain the interception rates of the feature-matching model corresponding to the plurality of sample thresholds; and select the sample threshold corresponding to the second preset interception rate from the obtained interception rates as the second decision-making threshold.

Optionally, the at least one auxiliary detection model includes a basic detection model and at least one feature verification model, where the first decision-making threshold corresponding to the basic detection model is obtained through testing the basic detection model, and the first decision-making threshold corresponding to each feature verification model is obtained through joint testing of the basic detection model and the corresponding feature verification model.

Optionally, the feature-matching module 603 is further configured to: for each of the at least one feature verification model, perform the following steps: obtaining the first sample image set and a plurality of sample thresholds; using the first sample image set to jointly test the basic detection model and the feature verification model, to obtain an interception rate of the feature verification model corresponding to each of the plurality of sample thresholds; and selecting a sample threshold corresponding to the third preset interception rate from the obtained interception rates as the first decision-making threshold for the feature verification model.

Optionally, the first decision-making threshold corresponding to each of the at least one auxiliary detection model is obtained through joint testing of the at least one auxiliary detection model.

Optionally, the device 600 further includes an update module 605, where the update module 605 is specifically configured to: update the first sample image set to obtain a second sample image set, where the distribution ratio of various sample images in the second sample image set is determined based on the distribution ratio of various original sample images in the first sample image set; and use the second sample image set to update the first decision-making threshold corresponding to each of at least one auxiliary detection model in the target scenario and the second decision-making threshold corresponding to the feature-matching model in the target scenario.

Optionally, the update module 605 is specifically configured to: iterate through multiple new abnormal sample images in the target scenario, and for each iteration of a new abnormal sample image, perform the following steps: using the at least one auxiliary detection model and the feature-matching model to perform facial recognition on the new abnormal sample image, and when the recognition fails, add the new abnormal sample image to the first sample image set; and after completing the iterations, taking the obtained first sample image set as the second sample image set.

Optionally, the basic detection model is a quality detection model, and the at least one feature verification model includes a liveness detection model and a non-synthetic image detection model, and the at least one verification score includes a quality detection score, a liveness detection score, and a non-synthetic image detection score.

The verification module 602 is specifically configured to: input the to-be-recognized facial image into the quality detection model to obtain a quality detection score of the to-be-recognized facial image; input facial features, of the to-be-recognized facial image, extracted by the quality detection model into the liveness detection model to obtain the liveness detection score of the to-be-recognized facial image; and input the facial features into the non-synthetic image detection model to obtain the non-synthetic image detection score of the to-be-recognized facial image.

Figure 7:
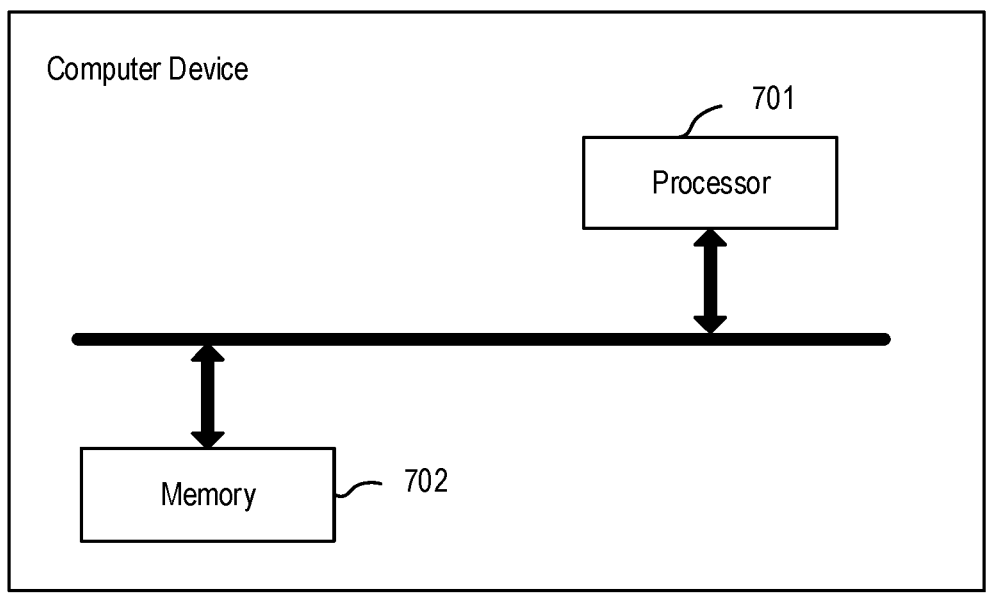
FIG. 7 illustrates a structural diagram of a computer device, according to embodiments of the disclosure.

Based on similar technological concepts, embodiments of the disclosure provide a computer device, which can be a terminal or server. As shown in FIG. 7, the computer device includes at least one processor 701 and a memory 702 coupled to the at least one processor. The specific connection medium between the processor 701 and the memory 702 is not limited in the embodiments of the disclosure. In the example in FIG. 7, the connection between the processor 701 and the memory 702 is illustrated as a bus connection. The bus can be a kind of address bus, data bus, control bus, etc.

In the embodiments of the disclosure, the memory 702 stores instructions that can be executed by the at least one processor 701. By executing the instructions stored in the memory 702, the at least one processor 701 can perform the steps included in the facial recognition methods described above.

The at least one processor 701 serves as the control center of the computer device, connecting various parts of the computer device through various interfaces and lines. By running or executing the instructions stored in the memory 702 and calling the data stored in the memory 702, the at least one processor 701 can perform facial recognition. Optionally, the processor 701 may include one or more processing units, and the processor 701 may integrate application processors and modem processors. The application processor mainly handles the operating system, user interface, and applications, while the modem processor mainly handles wireless communication. It is understood that the modem processor mentioned above may also be not integrated into the processor 701. In some embodiments, the processor 701 and the memory 702 can be implemented on the same chip, and in some embodiments, the two can be implemented on separate chips.

Processor 701 can be a general-purpose processor, such as a central processing unit (CPU), digital signal processor, Application Specific Integrated Circuit (ASIC), field-programmable gate array, or other programmable logic devices, discrete gates or transistor logic devices, discrete hardware components, capable of implementing or executing the various methods, steps, and logic diagrams disclosed in the embodiments of the disclosure. A general-purpose processor can be a microprocessor or any conventional processor. The steps of the methods disclosed in the embodiments of the disclosure can be directly implemented by hardware processors or executed by a combination of hardware and software modules within the processors.

Memory 702, as a non-volatile computer-readable storage medium, can be configured to store non-volatile software programs and non-volatile computer-executable programs and modules. Memory 702 may include at least one type of storage medium, such as flash memory, hard disk, multimedia card, card-type storage, Random Access Memory (RAM), Static Random Access Memory (SRAM), Programmable Read Only Memory (PROM), Read-Only Memory (ROM), Electrically Erasable Programmable Read-Only Memory (EEPROM), magnetic storage, disk, optical disk, and the like. Memory 702 is any medium capable of implementing functions including, but not limited to, carrying or storing desired program codes in the form of instructions or data structures and can be accessed by a computer. In the embodiments of the disclosure, memory 702 may also be a circuit or any other device capable of implementing storage functions for storing program instructions and/or data.

Based on similar inventive concepts, the embodiments of the disclosure provide a computer-readable storage medium storing computer programs that can be executed by a computer device. When the programs run on a computer device, the computer device performs the steps of the facial recognition methods disclosed above.

Based on similar inventive concepts, the embodiments of the disclosure provide a computer program product, where the computer program product includes a computer program stored on a computer-readable storage medium. The computer program includes program instructions that, when executed by a computer, cause the computer to perform the steps of the facial recognition methods described above.

Those skilled in the art should understand that the embodiments of the present disclosure can be implemented as methods, systems, or computer program products. Therefore, the present disclosure may take the form of fully hardware implementations, fully software implementations, or a combination of software and hardware implementations. Moreover, the present disclosure may be implemented in the form of a computer program product on one or more computer-readable storage media (including but not limited to disk storage, CD-ROM, optical storage, etc.) containing computer-executable program code.

The embodiments of the present disclosure are described with reference to flowcharts and/or block diagrams illustrating the methods, devices (systems), and computer program products consistent with the present disclosure. It should be understood that each flow and/or block in the flowcharts and/or block diagrams, and combinations of flows and/or blocks in the flowcharts and/or block diagrams, can be implemented by computer program instructions. These computer program instructions can be provided to a general-purpose computer, a special-purpose computer, an embedded processor, or other programmable data processing devices to generate a machine, such that the instructions executed by the processor of the computer or other programmable data processing devices result in a device for implementing the functions specified in the one or more flowcharts and/or one or more block diagrams.

These computer program instructions can also be stored in a computer-readable memory that can boot a computer or other programmable data processing devices to work in a specific manner, such that the instructions stored in the computer-readable memory produce a device including instructions for implementing the functions specified in the one or more flowcharts and/or one or more block diagrams.

What is claimed is:

1. A facial recognition method, comprising:
    obtaining a to-be-recognized facial image in a target scenario, the target scenario being one of liveness risk detection, hijacking risk detection, and recognition risk detection;
    using at least one auxiliary detection model to verify the to-be-recognized facial image, to obtain at least one verification score, wherein the at least one auxiliary detection model include a quality detection model, a liveness detection model, a non-synthetic image detection model;
    when each of the at least one verification score is greater than a first decision-making threshold of a corresponding auxiliary detection model in the target scenario, using a feature-matching model to perform feature matching on the to-be-recognized facial image, to obtain a target matching score; and
    when the target matching score is greater than a second decision-making threshold of the feature-matching model in the target scenario, determining that the to-be-recognized facial image is successfully recognized, wherein the second decision-making threshold is obtained through joint testing of the feature-matching model and the at least one auxiliary detection model,
    wherein:
    one of the at least one auxiliary detection model is used as a basic detection model and other ones of the one auxiliary detection model are used as at least one feature verification model;
    the first decision-making threshold corresponding to the basic detection model is obtained through testing the basic detection model, and the first decision-making threshold corresponding to each of the at least one feature verification model is obtained through joint testing of the basic detection model and the respective feature verification model; and
    the joint testing of the basic detection model and one of the at least one feature verification model comprises:
        obtaining a first sample image set and a plurality of sample thresholds;
        using the first sample image set to jointly test the basic detection model and the feature verification model, to obtain an interception rate of the feature verification model corresponding to each of the plurality of sample thresholds; and
        selecting, from the obtained interception rates, a sample threshold corresponding to a target preset interception rate as a first decision-making threshold corresponding to the feature verification model, wherein different interception rates are obtained for the feature verification model at different model risk levels so that the feature verification model has different first decision-making thresholds to be correspondingly used in different target scenarios.

2. The method according to claim 1, wherein obtaining the second decision-making threshold through joint testing of the feature-matching model and the at least one auxiliary detection model includes:
    using a first sample image set to jointly test the at least one auxiliary detection model and the feature-matching model, to obtain a predicted matching score for each original sample image in the first sample image set;
    based on a first preset interception rate, selecting at least one effective sample image from the first sample image set; and
    determining the second decision-making threshold based on a predicted matching score corresponding to each of the at least one effective sample image.

3. The method according to claim 2, wherein selecting at least one effective sample image from the first sample image set based on the first preset interception rate includes:
    multiplying the first preset interception rate by the number of original sample images in the first sample image set to obtain a target screening quantity;
    ranking the original sample images in the first sample image set in descending order of predicted matching score to obtain a sample image ranking result; and selecting the target screening quantity of effective sample images from the sample image set based on the sample image ranking result.

4. The method according to claim 2, wherein determining the second decision-making threshold based on a predicted matching score corresponding to each of the at least one effective sample image includes:
   selecting the minimum predicted matching score, from predicted matching scores corresponding to the at least one effective sample image, as the second decision-making threshold.

5. The method according to claim 1, wherein obtaining the second decision-making threshold through joint testing of the feature-matching model and the at least one auxiliary detection model includes:
   obtaining a first sample image set and a plurality of sample thresholds;
   using the first sample image set to jointly test the at least one auxiliary detection model and the feature-matching model, to obtain interception rates of the feature-matching model corresponding to the plurality of sample thresholds; and
   selecting, from the obtained interception rates, a sample threshold corresponding to a second preset interception rate as the second decision-making threshold.

6. The method according to claim 1, wherein the first decision-making threshold of the corresponding auxiliary detection model is obtained through joint testing of the at least one auxiliary detection model.

7. The method according to claim 1, further comprising:
   updating the first sample image set to obtain a second sample image set, wherein a distribution ratio of various sample images in the second sample image set is determined based on a distribution ratio of various original sample images in the first sample image set; and
   using the second sample image set to update the first decision-making threshold of the corresponding auxiliary detection model in the target scenario and the corresponding second decision-making threshold of the feature-matching model in the target scenario.

8. The method according to claim 7, wherein updating the first sample image set to obtain the second sample image set includes:
   iterating through a plurality of new abnormal sample images in the target scenario, and for each iterated new abnormal sample image, perform the following steps:
   using the at least one auxiliary detection model and the feature-matching model to perform facial recognition on the new abnormal sample image, and when the facial recognition fails, adding the new abnormal sample image to the first sample image set; and
   taking the first sample image set obtained after iterating through all new abnormal sample images as the second sample image set.

9. The method according to claim 1, wherein the basic detection model is the quality detection model, the at least one feature verification model includes the liveness detection model and the non-synthetic image detection model, and the at least one verification score includes a quality detection score, a liveness detection score, and a non-synthetic image detection score; and
   using the at least one auxiliary detection model to verify the to-be-recognized facial image to obtain at least one verification score includes:
   inputting the to-be-recognized facial image into the quality detection model to obtain the quality detection score of the to-be-recognized facial image;
   inputting facial features extracted by the quality detection model into the liveness detection model to obtain the liveness detection score of the to-be-recognized facial image; and
   inputting the facial features into the non-synthetic image detection model to obtain the non-synthetic image detection score of the to-be-recognized facial image.

10. A computer device, comprising a memory, a processor, and a computer program stored in the memory and executable on the processor, wherein the processor, when executing the computer program, performs operations including:
    obtaining a to-be-recognized facial image in a target scenario, the target scenario being one of liveness risk detection, hijacking risk detection, and recognition risk detection;
    using at least one auxiliary detection model to verify the to-be-recognized facial image, to obtain at least one verification score, wherein the at least one auxiliary detection model include a quality detection model, a liveness detection model, a non-synthetic image detection model;
    when each of the at least one verification score is greater than a first decision-making threshold of a corresponding auxiliary detection model in the target scenario, using a feature-matching model to perform feature matching on the to-be-recognized facial image, to obtain a target matching score; and
    when the target matching score is greater than a second decision-making threshold of the feature-matching model in the target scenario, determining that the to-be-recognized facial image is successfully recognized, wherein the second decision-making threshold is obtained through joint testing of the feature-matching model and the at least one auxiliary detection model,
    wherein:
    one of the at least one auxiliary detection model is used as a basic detection model and other ones of the one auxiliary detection model are used as at least one feature verification model;
    the first decision-making threshold corresponding to the basic detection model is obtained through testing the basic detection model, and the first decision-making threshold corresponding to each of the at least one feature verification model is obtained through joint testing of the basic detection model and the respective feature verification model; and
    the joint testing of the basic detection model and one of the at least one feature verification model comprises:
    obtaining a first sample image set and a plurality of sample thresholds;
    using the first sample image set to jointly test the basic detection model and the feature verification model, to obtain an interception rate of the feature verification model corresponding to each of the plurality of sample thresholds; and
    selecting, from the obtained interception rates, a sample threshold corresponding to a target preset interception rate as a first decision-making threshold corresponding to the feature verification model, wherein different interception rates are obtained for the feature verification model at different model risk levels so that the feature verification model has different first decision-making thresholds to be correspondingly used in different target scenarios.

11. A non-transitory computer-readable storage medium, storing a computer program executable on a computer device, wherein the computer program, when executed on the computer device, causes the computer device to perform:
   obtaining a to-be-recognized facial image in a target scenario, the target scenario being one of liveness risk detection, hijacking risk detection, and recognition risk detection;
   using at least one auxiliary detection model to verify the to-be-recognized facial image, to obtain at least one verification score, wherein the at least one auxiliary detection model include a quality detection model, a liveness detection model, a non-synthetic image detection model;
   when each of the at least one verification score is greater than a first decision-making threshold of a corresponding auxiliary detection model in the target scenario, using a feature-matching model to perform feature matching on the to-be-recognized facial image, to obtain a target matching score; and
   when the target matching score is greater than a second decision-making threshold of the feature-matching model in the target scenario, determining that the to-be-recognized facial image is successfully recognized, wherein the second decision-making threshold is obtained through joint testing of the feature-matching model and the at least one auxiliary detection model, wherein:
   one of the at least one auxiliary detection model is used as a basic detection model and other ones of the one auxiliary detection model are used as at least one feature verification model;
   the first decision-making threshold corresponding to the basic detection model is obtained through testing the basic detection model, and the first decision-making threshold corresponding to each of the at least one feature verification model is obtained through joint testing of the basic detection model and the respective feature verification model; and
   the joint testing of the basic detection model and one of the at least one feature verification model comprises:
      obtaining a first sample image set and a plurality of sample thresholds;
      using the first sample image set to jointly test the basic detection model and the feature verification model, to obtain an interception rate of the feature verification model corresponding to each of the plurality of sample thresholds; and
      selecting, from the obtained interception rates, a sample threshold corresponding to a target preset interception rate as a first decision-making threshold corresponding to the feature verification model, wherein different interception rates are obtained for the feature verification model at different model risk levels so that the feature verification model has different first decision-making thresholds to be correspondingly used in different target scenarios.

* * * * *